(12) United States Patent
Duan et al.

(10) Patent No.: US 10,553,043 B2
(45) Date of Patent: Feb. 4, 2020

(54) METHOD AND APPARATUS FOR PREDICTING OPERATING HEALTH OF A TORQUE CONVERTER CLUTCH

(71) Applicant: GM GLOBAL TECHNOLOGY OPERATIONS LLC, Detroit, MI (US)

(72) Inventors: Shiming Duan, Ann Arbor, MI (US); Chunhao J Lee, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 504 days.

(21) Appl. No.: 15/446,595

(22) Filed: Mar. 1, 2017

(65) Prior Publication Data

US 2018/0253913 A1 Sep. 6, 2018

(51) Int. Cl.
*G07C 5/08* (2006.01)
*F16D 48/06* (2006.01)
(Continued)

(52) U.S. Cl.
CPC .......... *G07C 5/0808* (2013.01); *F16D 48/06* (2013.01); *F16H 61/143* (2013.01);
(Continued)

(58) Field of Classification Search
CPC ... F16D 2500/1026; F16D 2500/10412; F16D 2500/1045; F16D 2500/3024;
(Continued)

(56) References Cited

U.S. PATENT DOCUMENTS

| 8,219,295 B2 * | 7/2012 | Oue ...................... F16H 61/143 |
| | | 192/3.31 |
| 2004/0102289 A1 * | 5/2004 | Aikawa ................. F16H 61/061 |
| | | 477/176 |

(Continued)

FOREIGN PATENT DOCUMENTS

| CN | 101440869 A | 5/2009 |
| CN | 101846176 A | 9/2010 |

(Continued)

*Primary Examiner* — Jacob S. Scott
(74) *Attorney, Agent, or Firm* — Quinn IP Law

(57) ABSTRACT

A method of predicting the health of and controlling a hydraulic pressure actuated torque converter lock-up clutch includes determining rotational input and output speeds of the torque converter. The method also includes determining a magnitude of the hydraulic pressure. The method additionally includes determining a level of performance of the clutch across multiple torque converter operating modes using the determined input and output torque converter speeds and the determined magnitude of the hydraulic pressure. The method also includes calculating a numeric state of health (SOH) coefficient of the clutch that quantifies a relative severity of degradation of a plurality of clutch characteristics across the multiple torque converter operating modes. Furthermore, the method includes executing a control action relative to the clutch when the calculated numeric SOH coefficient for specified torque converter operating mode(s) is less than a calibrated SOH threshold.

20 Claims, 3 Drawing Sheets

(51) Int. Cl.
*F16H 61/14* (2006.01)
*F16H 45/02* (2006.01)

(52) U.S. Cl.
CPC .... *G07C 5/0816* (2013.01); *F16D 2500/1026* (2013.01); *F16D 2500/1045* (2013.01); *F16D 2500/10412* (2013.01); *F16D 2500/3024* (2013.01); *F16D 2500/30412* (2013.01); *F16D 2500/30415* (2013.01); *F16D 2500/30426* (2013.01); *F16D 2500/50233* (2013.01); *F16H 45/02* (2013.01)

(58) Field of Classification Search
CPC . F16D 2500/30412; F16D 2500/30415; F16D 2500/30426; F16D 2500/50233; F16D 25/0638; F16D 48/06; F16H 2061/1208; F16H 45/02; F16H 61/12; F16H 61/143; G07C 5/0808; G07C 5/0816
See application file for complete search history.

(56) References Cited

U.S. PATENT DOCUMENTS

| | | | |
|---|---|---|---|
| 2016/0017988 A1* | 1/2016 | Shigenaga | F16H 61/12 192/3.29 |
| 2017/0276243 A1* | 9/2017 | Matsubara | F16H 61/143 |

FOREIGN PATENT DOCUMENTS

| | | |
|---|---|---|
| CN | 102072029 A | 5/2011 |
| CN | 102141140 A | 8/2011 |
| CN | 102374284 A | 3/2012 |
| CN | 102537334 A | 7/2012 |
| CN | 103574006 A | 2/2014 |
| CN | 104913082 A | 9/2015 |
| CN | 106015556 A | 10/2016 |
| CN | 106043290 A | 10/2016 |

* cited by examiner

METHOD AND APPARATUS FOR PREDICTING OPERATING HEALTH OF A TORQUE CONVERTER CLUTCH

INTRODUCTION

The disclosure relates to a method and an apparatus for predicting operating health of an automatic transmission torque converter clutch.

Modern motor vehicles frequently employ a powertrain that includes a power-source, such as an internal combustion engine, connected to a multi-speed automatically-shiftable or automatic transmission that is adapted to manipulate and transmit power from the engine to a final drive (e.g., driveshaft, differential, and wheels) for propelling the vehicle. Traditional powertrains having an automatic transmission generally include a hydrodynamic input device, such as a torque converter, positioned between the engine and the transmission. The torque converter is a hydrokinetic fluid coupling employed predominantly to allow the engine to run without stalling when the vehicle wheels and transmission gears come to a stop, and to provide torque multiplication in the lower speed range of the engine.

The hydrodynamic torque converter generally includes an impeller member, a bladed turbine, and a fluid stator. The impeller member, also referred to in the art as the torque converter pump, is secured to an annular shell member that is adapted to drivingly connect the impeller to the engine crankshaft. The bladed turbine is traditionally connected to an input shaft of the automatic transmission through a turbine hub. The stator mechanism, disposed between the fluid inlet of the impeller and the fluid outlet of the turbine, redirects fluid from the turbine to the impeller to improve flow efficiency and increase torque multiplication of the torque converter. The impeller accelerates hydraulic fluid for passage to the turbine; the turbine in turn converts the kinetic energy from the impeller into mechanical energy, which is transmitted to the transmission input shaft.

In many torque converter assemblies, the annular shell member and the bladed turbine cooperate to form a chamber for housing a torque converter clutch (or "TCC"), also referred to in the art as a lock-up clutch. The TCC is operated to provide a functional bypass mechanism, allowing the engine to circumvent the torque converter fluid coupling and transmit power directly to the transmission. Additionally, a majority of modern TCC's employ a friction clutch having a pressure plate with a friction surface disposed thereon and biased out of engagement with the annular shell member by a spring member. The pressure plate responds to a hydraulic actuator imparting fluid pressure thereto, urging the friction surface against the annular shell member, effectively locking the impeller to the turbine. The TCC may be fully engaged (completely locked-up) or partially engaged (selectively "slip" in a controllable manner.)

SUMMARY

A method of predicting the health of and controlling a lock-up clutch actuated via a hydraulic pressure and arranged inside an automatic transmission torque converter includes determining, via a controller, rotational input and output speeds of the torque converter. The prognostic method additionally includes determining, via the controller, a magnitude of the hydraulic pressure. The determination of the magnitude of the hydraulic pressure may be accomplished using a determination of input torque to the torque converter. The method also includes determining, via the controller, a level of performance of the lock-up clutch across multiple torque converter operating modes using the determined rotational input and output speeds of the torque converter and the determined magnitude of the hydraulic pressure.

The method additionally includes calculating, via the controller, a numeric state of health (SOH) coefficient of the lock-up clutch that quantifies a relative severity of degradation of a plurality of lock-up clutch characteristics across the multiple torque converter operating modes. Furthermore, the method includes executing, via the controller, a control action with respect to the lock-up clutch when the calculated numeric SOH coefficient for at least one of the torque converter operating modes is less than a calibrated SOH threshold.

The lock-up clutch may be a friction clutch. In such a case, the lock-up clutch characteristics may include at least one of a friction coefficient and a rotational speed variation thereof.

The method may also include detecting the hydraulic pressure via a hydraulic pressure sensor. Accordingly, the method may additionally include receiving, via the controller, the detected hydraulic pressure to determine the magnitude of the hydraulic pressure.

The act of calculating the numeric SOH coefficient of the lock-up clutch may be accomplished via a regression analysis.

The act of calculating the numeric SOH coefficient of the lock-up clutch may be accomplished via a time domain analysis.

The act of calculating the numeric SOH coefficient of the lock-up clutch may be accomplished via a frequency domain analysis.

The control action may include activating a sensory signal, such as a service indicator configured to signal that service of the lock-up clutch is required.

The control action may be further configured to selectively provide the numeric SOH coefficient to a service provider for the torque converter.

The SOH coefficient may specifically be an indicator of percentage of health of the lock-up clutch.

The control action may include adjusting the magnitude of the hydraulic pressure.

The method may also include determining an input torque to the torque converter, and the control action may also include reducing the input torque.

A vehicle employing an electronic controller configured to perform the above prognostic method is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
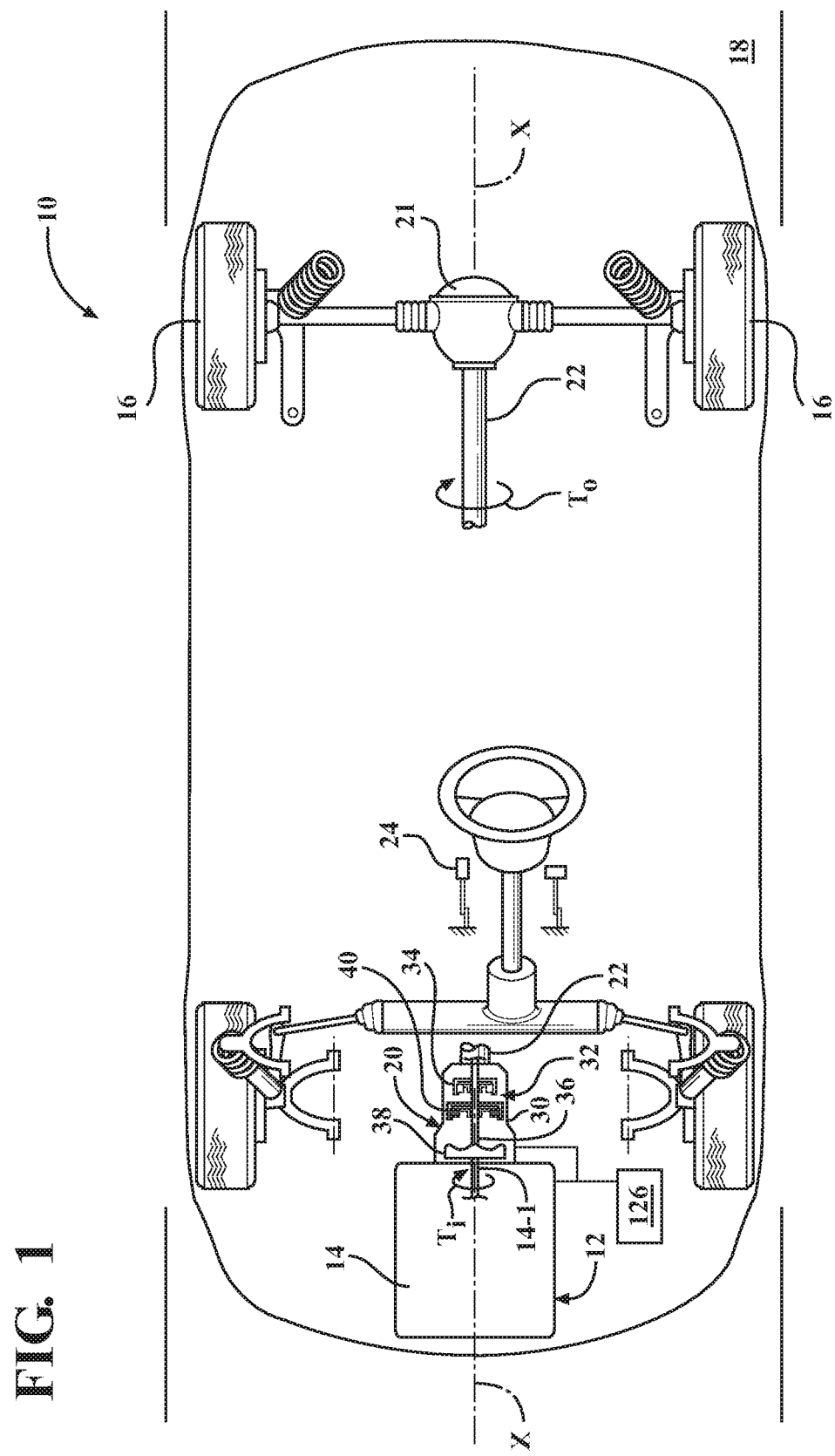
FIG. 1 is a schematic illustration of a vehicle employing a powertrain that includes an internal combustion engine connected to an automatic transmission via a torque converter having a lock-up clutch, according to the disclosure.

Referring to FIG. 1, a vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be another mobile platform, such as an airplane, all-terrain vehicle (ATV), boat, personal movement apparatus, robot and the like to accomplish the purposes of this disclosure. The powertrain 12 includes a power-source 14 configured to generate torque $T_i$ for propulsion of the vehicle 10 via drive wheels 16 relative to a road surface 18. The powertrain 12 also includes a multiple speed-ratio automatically-shiftable, a.k.a., automatic, transmission 20.

The automatic transmission 20 may be configured as an assembly that automatically shifts between or selects discrete gear-ratios or a continuously variable gear-ratio transmission (CVT). In some vehicle configurations, the powertrain 12 may be mounted longitudinally in the vehicle 10, i.e., substantially aligned with the longitudinal axis X of the vehicle. In other vehicle configurations, the powertrain 12 may be mounted transversely in the vehicle 10, i.e., at approximately 90 degrees relative to the longitudinal axis X of the vehicle. Such a transverse mounting of the powertrain 12 is frequently employed for packaging purposes in front-wheel-drive (FWD) vehicles, where the drive wheel(s) 16 are arranged proximate a front end of the vehicle 10. In such vehicle configurations, the automatic transmission 20 may be combined with a final drive assembly 21 and is generally described as a transaxle. Although the longitudinal transmission embodiment of the automatic transmission 20 is specifically referred to below, the disclosure is also applicable to transaxle configurations of the automatic transmission 20.

The automatic transmission 20 is operatively connected to the power-source 14, i.e., externally mounted to the power-source and configured to transfer the torque $T_i$ generated by the power-source to the drive wheels 16. The transmission 20 is further configured to receive and then selectively multiply, reduce, or leave unmodified the torque $T_i$ to achieve a resultant transmission output torque $T_o$ for driving the vehicle 10. The drive wheels 16 may be operatively connected to the transmission 20, such as via a driveshaft 22, and configured to receive the transmission output torque $T_o$. A vehicle accelerator 24, such as a pedal or a lever, is provided for the vehicle operator to control the power-source torque $T_i$ for driving the vehicle 10.

The power-source 14 may include an internal combustion engine, a fuel-cell, and/or an electric motor (not shown) mounted in the vehicle 10 and having the automatic transmission 20 mounted externally thereto. However, for conciseness and clarity, the present disclosure will concentrate on the embodiment of the power-source 14 that includes solely the internal combustion engine. Accordingly, although the numeral 14 should be seen as generally attributable to such embodiments of the envisioned powertrain, for the remainder of the present disclosure, the numeral 14 will be used to denote the specific embodiment of the powertrain having solely the internal combustion engine. As such, the power-source input torque $T_i$ will be hereinafter referenced as engine 14 torque. Although not shown, the particular engine 14 includes a crankshaft for converting reciprocal motion of its pistons (not shown) into rotational motion and generating the input torque $T_i$.

Figure 2:
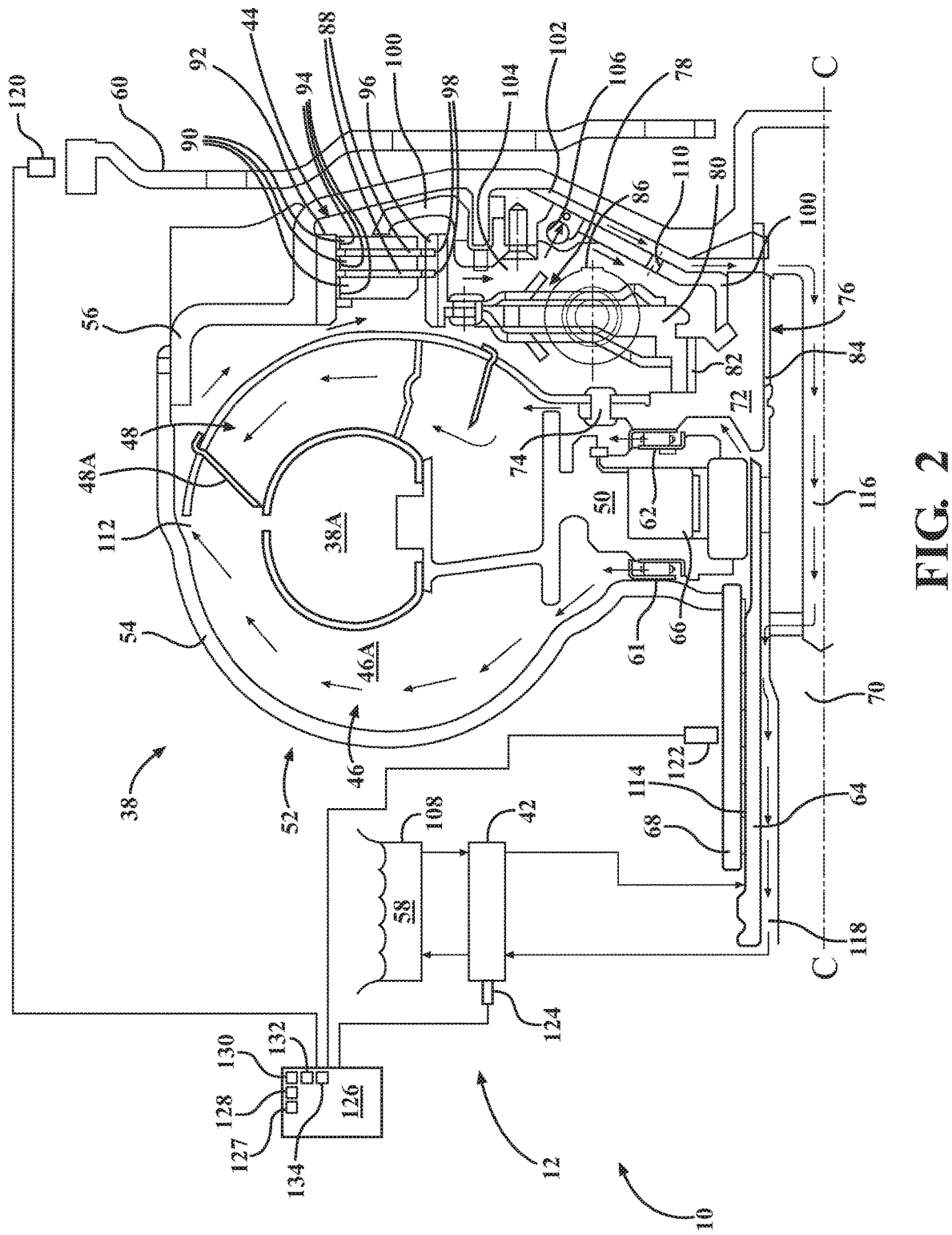
FIG. 2 is a schematic close-up cross-sectional side view of the torque converter and the lock-up clutch shown in FIG. 1.

The transmission 20 is paired with the engine 14 at an engine-transmission interface using appropriate means, including fasteners (not shown), such as threaded screws and dowels. As shown in FIG. 1, the transmission 20 includes a transmission housing or case 30 for retaining a gear-train 32 configured to provide a plurality of selectable gear ratios for operatively connecting the engine crankshaft to the drive wheels 16 and power the vehicle in a variety of speed ranges. The gear-train 32 may include a number of gear elements 34, for example one or more planetary gear-sets (shown) or variable diameter pulleys (not shown) configured to provide a predetermined number of selectable gear ratios or a continuously variable gear ratio, respectively, and for operatively connecting the engine crankshaft to the drive wheels 16. The transmission 20 also includes an input member 36, such as a shaft, configured to receive the engine 14 torque $T_i$ and transfer the subject torque to the gear-train 32. As also shown in FIG. 2, the input member 36 is configured to rotate about an axis X. The transmission input member 36 is generally selectively connectable to the engine 14 through a torque converter assembly 38, such via a crankshaft 14-1.

As shown, the transmission 20 may also include one or more torque transmitting devices 40, such as clutches and brakes, retained by the transmission housing 30. The gear-train 32 and the torque transmitting device(s) 40 are operatively connected to the input member 36 and are cooperatively configured to select transmission speed ratios to generate a predetermined amount of transmission output torque $T_o$. The transmission speed ratio is generally defined as the transmission input speed divided by the transmission output speed. Shifting from one speed ratio to another is typically performed in response to a position of the vehicle accelerator 24 and assessed vehicle road speed. Shifting between speed ratios generally involves releasing one or more "off-going" torque transmitting devices 40 associated with the current speed ratio, and applying one or more "on-coming" torque transmitting devices 40 associated with the desired speed ratio. The transmission 20 may be operatively connected to a differential or final-drive assembly 21 configured to transmit the transmission output torque $T_o$ to the drive wheels 16 for powering the vehicle 10.

The vehicle 10 also includes a fluid pump 42 configured to generate and supply a hydraulic pressure to the torque converter assembly 38 and which may be employed to operate the torque transmitting device(s) 40 for selecting discrete gear ratios in the multi-speed automatic transmission, or to vary diameter of the pulleys in the CVT. The torque converter assembly 38 is arranged between the engine 14 and the transmission 20 and, as noted above, configured to operatively connect the engine to the transmission. As shown in FIG. 2, the torque converter assembly 38 includes a lock-up clutch 44, which is depicted in the Figures as an electronically controlled converter clutch or ECCC. The torque converter assembly 38 also includes a torque converter impeller 46 having impeller blades 46A and a turbine 48 having turbine blades 48A, which together form a fluid coupling portion 38A of the torque converter.

The ECCC 44 is arranged operatively in parallel with the fluid coupling 38A and configured to be selectively actuated by the hydraulic pressure generated via the pump 42 to mechanically connect the engine 14 to the transmission 20. The impeller 46 is situated in serial power flow, fluid communication with the turbine 48, and operates as a fluid pump to affect coupling with the turbine 48. The torque converter assembly 38 also includes a stator 50. The stator 50 is interposed between the impeller 46 and the turbine 48 and configured to alter fluid flow returning from the turbine 48 to the impeller 46, as will be explained in more detail below. As shown, the torque converter assembly 38 also includes an annular housing member 52, defined by a pump shell portion 54 fixedly attached, e.g., via welding, to a front cover 56 such that a chamber full of hydraulic fluid 58 is formed therebetween. A flex plate 60 is adapted, e.g., via a plurality of fasteners (not shown), to both the engine 14 and the annular housing member 52 such that engine 14 torque $T_i$ is transferable therebetween.

The transfer of the engine 14 torque $T_i$ from the annular housing member 52 and the impeller 46 to the turbine 48 through operation of the hydraulic fluid 58 generally occurs in the following manner. Rotation of the impeller 46 causes the hydraulic fluid 58 to be directed outward toward the turbine blades 48A. When the rotation of the impeller 46 generates sufficient fluid force to overcome resistance to rotation by the turbine 48, the turbine begins to rotate coaxially with the impeller 46. The fluid flow exiting the turbine 48 is directed back into the impeller 46 by way of the stator 50. The stator 50 redirects the fluid flow from the turbine 48 to the impeller 46 in the same direction as impeller rotation, thereby reducing pump torque and causing torque multiplication.

The torque converter assembly 38 generally includes first and second thrust bearings 61, 62, respectively, configured to rotatably support the stator 50. The stator 50 is connected to a stator shaft 64 by way of a one-way roller clutch 66 that is operable to prevent rotation of the stator 50 at low torque converter rotational speeds. At higher torque converter rotational speeds, the direction of hydraulic fluid 58 leaving the turbine 48 changes, causing the stator 50 to over-run the one-way clutch 66 and rotate freely on the stator shaft 64. The impeller 46 is secured to the pump hub 68, whereas the turbine 48 is secured to a turbine shaft 70. Additionally, a locking mechanism 72 is disposed between, and configured to operatively couple the turbine 48 and the turbine shaft 70. The locking mechanism 72 is secured to the turbine 48 by, for example, a plurality of rivets 74, and engages the turbine shaft 70 via a splined interface 76.

With continued reference to FIG. 2, the torque converter assembly 38 also includes an isolator or rotational damper 78. A radially inner portion 80 of the isolator 78 is splined at an interface 82 to the locking mechanism 72, which is in turn splined at an interface 84 to the turbine shaft 70. The isolator 78 includes a plurality of isolator springs 86 configured to at least partially absorb engine torque spikes in order to provide smoother vehicle operation.

The front cover 56 and turbine 48 cooperate to house the ECCC 44, positioned therebetween, within the torque converter assembly 38. As shown in FIG. 2, the ECCC 44 includes a friction clutch assembly or a clutch pack, defined herein by a plurality of friction plates 88 interspersed between a plurality of reaction plates 90. The reaction plates 90 are operatively connected to the front cover 56 of the annular housing member 52 via housing extension 92 via meshing engagement with splines 94. The friction plates 88 are operatively connected with a radial outer portion 96 of the isolator 78 via meshing engagement with splines 98. As shown, the ECCC 44 is hydraulically actuated, i.e., the various operating modes of the ECCC 44 are selectable by manipulating transfer of the hydraulic fluid 58 through the torque converter assembly 38 in a predetermined manner, as will be described in detail below.

The ECCC 44 includes a piston 100 configured to selectively bring the reaction plates 90 into frictional contact with the friction plates 88 and thereby engage the ECCC 44. A first cavity 102 is defined between the piston 100 and the front cover 56. A second cavity 104 is defined between the piston 100 and the isolator 78. The ECCC 44 also includes a one-way valve 106 configured to control the transfer of hydraulic fluid 58 from the second cavity 104 to the first cavity 102, as will be discussed in further detail below. While a single one-way valve 106 is shown, it should be appreciated that multiple valves may alternatively be implemented. The pump 42 is fluidly coupled to the torque converter assembly 38 and operable to generate hydraulic pressure and transfer pressurized hydraulic fluid 58 from a sump volume 108 thereto. After being circulated through the torque converter assembly 10, the pump 42 returns the hydraulic fluid 58 to the sump volume 108.

The one-way valve 106 is operable to block the transfer of hydraulic fluid 58 from the first cavity 102 to the second cavity 104. Therefore, the transfer of hydraulic fluid 58 from the first cavity 102 to the second cavity 104 takes place almost exclusively through one or more orifices 110; the rate of such transfer is generally dictated by the size, e.g., diameter, of the orifice(s) 110. The orifice(s) 110 allow for the circulation of a predetermined amount of hydraulic fluid 58 throughout the torque converter assembly 38 to mitigate heat buildup. The hydraulic fluid 58 in the second cavity 104 is received through an opening 112 between the turbine 48 and the pump shell portion 54. After transferring through the opening 112, the hydraulic fluid 58 passes via a first flow path across the blades 48A of the turbine 48 and through the second thrust bearing 62, and via a second flow path across the blades 46A of the impeller 46 and through the thrust bearing 61. The first and second flow paths come together at a release passage 114, which routes the hydraulic fluid back to the sump volume 108 of FIG. 1.

When the fluid pressure in the second cavity 104 exceeds the pressure in the first cavity 102, the piston 100 translates axially along a centerline C in a direction toward the flex plate 60 (as shown in FIG. 1), thereby disengaging the clutch pack, i.e., reaction plates 90 and friction plates 88. When the fluid pressure in the first cavity 102 exceeds that in the second cavity 104, the piston 100 translates axially along centerline C in a direction away from the flex plate 60, thereby engaging the clutch pack. The amount by which the pressure in the first cavity 102 exceeds the pressure in the second cavity 104 dictates the degree of ECCC 44 engagement. By way of example, if the pressure in the first cavity 102 even slightly exceeds the pressure in the second cavity 104, the ECCC 44 becomes partially engaged, and may therefore slip.

The ECCC 44 has three primary operational modes: "disengaged", "fully engaged", and "partially engaged". "Disengaged" refers to the mode wherein the reaction plates 90 and friction plates 88 do not come into contact with each other and are therefore free to rotate independently. "Fully engaged" refers to the mode wherein the reaction plates 90 and friction plates 88 are brought into engagement with an apply force that is sufficient to prevent relative rotation or "slip" under normal operating conditions. "Partially engaged" refers to the mode wherein the reaction plates 90 and friction plates 88 are brought into engagement with a reduced apply force such that the reaction plates 90 and friction plates 88 slip relatively in a controllable manner. By controlling the pressure levels in the cavities 102 and 104, as described above, the ECCC 44 may correspondingly be controlled to disengage, completely engage, or partially engage and slip in a controllable manner.

When the ECCC 44 is in the disengaged mode, the engine 14 transfers torque $T_i$ through the torque converter assembly 38 to the transmission 20. Specifically, torque $T_i$ is passed from the engine crankshaft through the flex plate 60 (adapted to drivingly connect the engine to the housing member 52) to the impeller 46. Thereafter, engine torque $T_i$ is transferred from the impeller 46 to the turbine 48 through operation of the hydraulic fluid 58, as described above. The turbine 48 is coupled to the turbine shaft 70, which is operatively connected to a driving member (not shown) of the transmission 20. When the ECCC 44 is disengaged, the path of engine torque $T_i$ bypasses the isolator 78.

When the ECCC 44 is fully engaged, the engine torque $T_i$ circumvents the fluid coupling portion 38A, i.e., the impeller 46 and the turbine 48, of the torque converter assembly 38, transmitting the engine torque directly to the transmission 20 without efficiency losses associated with the operation of the hydraulic fluid 58. As will be described in detail hereinafter, engagement of the ECCC 44 couples the impeller 46 and the turbine 48 such that the two components rotate as a single unit. When the ECCC 44 is fully engaged, the path of the engine torque $T_i$ is through the isolator 78100, and the inertia of the turbine 48 is downstream relative to the isolator 78100.

When the ECCC 44 is partially engaged, it may selectively slip in a controllable manner and thereby transfer torque $T_i$ both directly to the transmission 20 through the isolator 78100, and via the fluid coupling portion 38A. By controlling the degree of ECCC 44 engagement, and correspondingly the amount of slip, the ECCC 44 may be implemented to at least partially absorb engine torque $T_i$ spikes and thereby provide smoother operation of the vehicle 10.

To release the ECCC 44, the pump 42 is operated to transfer hydraulic fluid 58 through the torque converter assembly 38 in the direction of the arrows of FIG. 2. The hydraulic fluid 58 is transferred initially from the sump volume 108 through the release passage 114 between the pump hub 68 and the stator shaft 64. The hydraulic fluid 58 thereafter passes through the first thrust bearing 61, across the blades 46A of the impeller 46, and the second thrust bearing 62, across the blades 48A of the turbine 48. Subsequently, the hydraulic fluid 58 exits through the opening 112 between the turbine 48 and the shell 54 of the housing member 52, passes by the clutch pack, i.e., plates 88, 90, of the ECCC 44, and into the second cavity 104. The hydraulic fluid 58 is then transferred from the second cavity 104 to the first cavity 102 through the one-way valve 106 and orifice 110, which is then transferred through a third cavity 116 defined by the turbine shaft 70, out of an apply passage 118 between the stator shaft 64 and the turbine shaft 70, and back to the sump 108. It should be readily appreciated that the pumping of hydraulic fluid 58 into the second cavity 104 generates pressure therein such that the piston 100 is translated away from the clutch pack, i.e., plates 88, 90, and the ECCC 44 remains disengaged.

To either partially or completely engage the ECCC 14, the pump 42 is operated to transfer hydraulic fluid 58 through the torque converter assembly 38 in a direction opposite to that shown by the arrows in FIG. 2, and previously described with respect to the release of the ECCC 44. More specifically, to engage the ECCC 44, the pump 42 initially transfers hydraulic fluid 58 from the sump volume 108 through the apply passage 118 and into the first cavity 102, generating pressure therein such that the piston 100 is translated toward the clutch pack, i.e., friction plates 88 and reaction plates 90. Urging of the piston 100 in this manner applies a force tending to bring the reaction plates 90 into contact with the friction plates 88 such that the ECCC 44 is engaged. The magnitude of the force applied by the piston 100 is proportional to the pressure level in the first cavity 102. Therefore, the degree of ECCC 44 engagement is selectable by controlling the output of the pump 42 and the hydraulic pressure generated thereby, as the pump transfers hydraulic fluid 58 into the first cavity 102.

As shown in FIG. 2, the powertrain 12 of the vehicle 10 may also include an input speed sensor 120 configured to detect a rotational input speed $W_i$ of the torque converter assembly 38, and a rotational output speed sensor 122 configured to detect an output speed $W_o$ of the torque converter assembly. The vehicle 10 may additionally include a hydraulic pressure sensor 124 configured to detect the hydraulic pressure generated by the pump 42. As shown in each of FIGS. 1 and 2, the vehicle 10 further includes an electronic controller 126. The controller 126 may be a powertrain controller, for example, configured to regulate operation of the engine 14 and the automatic transmission 20 in response to command(s) from an operator of the subject vehicle. In order to appropriately perform the above tasks, the controller 126 includes a memory, at least some of which is tangible and non-transitory.

The memory of the controller 126 may be a recordable medium that participates in providing computer-readable data or process instructions. Such a medium may take many forms, including but not limited to non-volatile media and volatile media. Non-volatile media for the controller 126 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer.

Memory of the controller 126 may also include a flexible disk or a hard disk, magnetic tape, other magnetic medium, a CD-ROM, DVD, other optical medium, etc. The controller 126 may be configured or equipped with other required computer hardware, such as a high-speed clock, requisite Analog-to-Digital (A/D) and/or Digital-to-Analog (D/A) circuitry, necessary input/output circuitry and devices (I/O), as well as appropriate signal conditioning and/or buffer circuitry. Algorithms required by the controller 126 or accessible thereby may be stored in the memory and automatically executed to provide the required functionality. The controller 126 is also configured to regulate operation of the ECCC 44 to achieve a predetermined amount of transmission output torque $T_o$. As shown in each of FIG. 1, the controller 126 may be in electronic communication with the input and output speed sensors 120, 122, and with the hydraulic pressure sensor 124, for predicting the health of and controlling the ECCC 44.

The controller 126 is programmed or configured to determine the input torque $T_i$ that is applied to the converter assembly 38. Such an input torque $T_i$ determination may be accomplished using a reference data table (not shown) programmed into the controller. The controller 126 is also configured to determine the rotational input and output speeds $W_i$, $W_o$ of the torque converter assembly 38. Such a determination may include detection of the rotational input and output speeds via respective input and output speed sensors 120, 122 and receiving, via the controller 126, signals indicative of the subject speeds $W_i$, $W_o$ from the input and output speed sensors.

The controller 126 is additionally configured to determine a magnitude 127 of the hydraulic pressure, which may be accomplished via a reference table (not shown) programmed into the controller, including data for the determined input torque $T_i$ versus hydraulic pressure and rotational input speed $W_i$. The determination of the magnitude 127 of the hydraulic pressure may alternatively be accomplished via receiving signals indicative of the detected hydraulic pressure from the sensor 124. The controller 126 is also configured to determine a level of performance of the ECCC 44 across multiple torque converter operating modes using the determined rotational input and output speeds $W_i$, $W_o$ of the torque converter assembly 38 and the determined magnitude of the hydraulic pressure.

The controller 126 is additionally configured to calculate a numeric state of health (SOH) coefficient 128 of the ECCC 44 that quantifies a relative severity of degradation of a plurality of ECCC characteristics across the multiple operating modes of the torque converter assembly 38. The contemplated ECCC 44 clutch characteristics include a change in friction coefficient $\mu$ of the friction plates 88, which may result in slippage of the friction plates, and/or a variation in rotational speed $\omega_p$ of the friction plates 88 relative to the reaction plates 90. Such variation in rotational speed $\omega_p$ of the friction plates 88 may signal undesirable slip of the friction plates as a result of degradation of the friction coefficient $\mu$ and/or a drop in the magnitude of the hydraulic pressure.

The controller 126 is further configured to execute a control action 130 with respect to the ECCC 44. Specifically, the control action 130 is intended to be executed by the controller 126 when the calculated numeric SOH coefficient 128 for at least one of specific operating modes of the torque converter assembly 38 is less than a calibrated SOH threshold 132. The calibrated SOH threshold 132 may be determined empirically during validation and testing of the ECCC 44, whether as part of dedicated lock-up clutch testing, or as part of testing of the torque converter assembly 38, the transmission 20, and/or the vehicle 10. The calculated numeric SOH coefficient 128 may be compared with the calibrated SOH threshold 132 for any engine 14 operating point on the torque $T_i$ curve, and the identified discrete SOH coefficients 128 for such operating points may be saved in the memory of the controller 126.

The control action 130 may include activation of a sensory signal 134, such as a malfunction indicator light (MIL), configured to signal to either an operator of the vehicle 10 or a service provider that service of the ECCC 44 is required. The control action 130 may further include selective provision of the numeric SOH coefficient 128 to a service provider for the torque converter assembly 38. The numeric SOH coefficient 128 may be an indicator of percentage of health of the ECCC 44. The control action 130 may further include adjustment of the magnitude 127 of the hydraulic pressure. Additionally, each instance of activation of the sensory signal 134 may be saved in the memory of the controller 126.

The control action 130 may include reducing the input torque $T_i$. The control action 130 may additionally include limiting operation of the engine 12 to a prescribed limp-home mode, where the input torque $T_i$ is reduced to a predetermined value, if the calculated numeric SOH coefficient 128 is less than a calibrated SOH threshold 132. The controller 126 may be configured to calculate the numeric SOH coefficient 128 of the ECCC 44 via various mathematical function analysis methodologies or approaches. The specific approach to determining the numeric SOH coefficient 128 of the ECCC 44 may be selected based on the specific ECCC 44 clutch characteristic, its relationship to or interdependence with other characteristic(s), and the quality of the data representative thereof.

For example, the controller 126 may be configured to calculate the numeric SOH coefficient 128 of the ECCC 44 via a regression analysis. In statistical modeling, regression analysis is a statistical process for estimating the relationships among variables. Regression analysis includes many techniques for modeling and analyzing several variables when the focus is on the relationship between a dependent or "criterion" variable and one or more independent variables or "predictors". More specifically, regression analysis facilitates an understanding of how a representative value of the dependent variable changes when one of the independent variables is varied, while the other independent variables are held fixed. Alternatively, the controller 126 may be configured to calculate the numeric SOH coefficient 128 via a time domain analysis. Time domain is the analysis of mathematic functions, physical signals or time series of economic or environmental data, with respect to time. In the time domain, the signal or function's value is known for all real numbers, for the case of continuous time, or at various separate instants in the case of discrete time. A time-domain graph shows how a signal changes with time.

In a yet another embodiment, the controller 126 may be configured to calculate the numeric SOH coefficient 128 via a frequency domain analysis. In statistical signal processing, frequency domain analysis or spectral density estimation (SDE) is an algorithm that estimates the strength of different frequency components, i.e., the power spectrum, of a time-domain signal. In general, spectral density, a.k.a., power spectral density, characterizes the frequency content of the evaluated signal. By comparison to a time-domain graph, a frequency-domain graph shows how much of the signal lies within each given frequency band over a range of frequencies. The goal of SDE is to estimate the spectral density of a random signal from a sequence of time samples of the signal. One purpose of estimating the spectral density is to detect periodicities in the data, by observing peaks at the frequencies corresponding to these periodicities.

Figure 3:
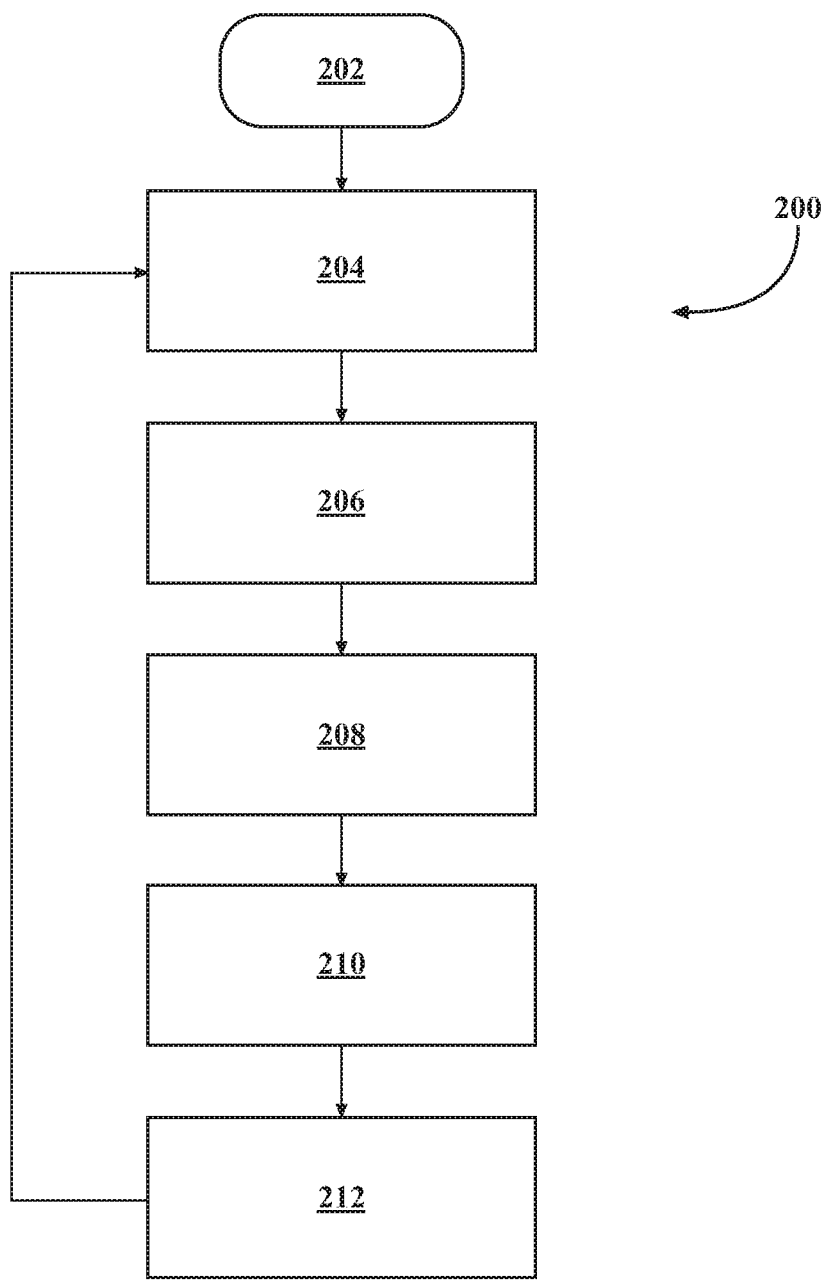
FIG. 3 is a flow diagram of a prognostic method structured to predict the health and control operation of the lock-up clutch shown in FIGS. 1 and 2.

FIG. 3 depicts a prognostic method 200 configured to predict health of the lock-up clutch, e.g., ECCC 44. Besides predicting the health of the ECCC 44, the method includes operating the ECCC in response to the predicted, as described above with respect to FIGS. 1 and 2. The method 200 initiates in frame 202 with the pump shell portion 54 of the torque converter assembly 38 being rotated by the engine 14 and receiving the pressurized fluid 58 supplied by the pump 42. Following frame 202, the method proceeds to frame 204. In frame 204 the method includes determining rotational input and output speeds $W_i$, $W_o$ of the torque converter assembly 38, such as via the controller 126 accessing a data table or receiving signals from the respective input and output speed sensors 120, 122 indicative of the detected rotational input and output speeds $W_i$, $W_o$ of the torque converter assembly 38.

Following frame 204 the method proceeds to frame 206, where the method includes determining, via the controller 126, magnitude 127 of the hydraulic pressure generated by the pump 42 and employed by the torque converter assembly 38. As described with respect to FIGS. 1 and 2, in frame 206 determining the magnitude 127 of the hydraulic pressure may include accessing a reference table via the controller 126. Alternatively, the determination of the magnitude 127 of the hydraulic pressure may include detecting the hydraulic pressure via a hydraulic pressure sensor 124 and receiving a signal indicative of the detected hydraulic pressure via the controller 126. After frame 206, the method advances to frame 208. In frame 208 the method includes determining, via the controller 126, a level of performance of the lock-up clutch, i.e., the ECCC 44, across multiple torque converter assembly 38 operating modes using the detected rotational input and output speeds $W_i$, $W_o$ and the determined magnitude 127 of the hydraulic pressure.

Following frame 208, the method moves on to frame 210. In frame 210 the method includes calculating, via the controller 126, the numeric SOH coefficient 128 of the ECCC 44 that quantifies a relative severity of degradation of a plurality of lock-up clutch characteristics across the multiple torque converter operating modes. As described above with respect to FIGS. 1-2, calculation of the numeric SOH coefficient 128 of the lock-up clutch may be accomplished via regression analysis, time domain analysis, or frequency domain analysis. After frame 210, the method proceeds to frame 212. In frame 212 the method includes executing, via the controller 126, a control action with respect to the ECCC 44 when the calculated numeric SOH coefficient 128 for at least one of the torque converter operating modes is less than the calibrated SOH threshold 132.

As also described with respect to FIGS. 1-2, the control action 130 may include activating a service indicator configured to signal that service of the ECCC 44 is required. The control action 130 may be further configured to provide the numeric SOH coefficient 128 to the vehicle operator or to a torque converter service provider, such as a dealership technician. Furthermore, the control action 130 may include adjustment of the magnitude 127 of the hydraulic pressure and/or reducing the input torque $T_i$. As part of control action 130, the method may additionally include limiting operation of the engine 14 to a prescribed limp-home mode, where the input torque $T_i$ is reduced to a predetermined value, if the calculated numeric SOH coefficient 128 is less than a calibrated SOH threshold 132.

Following frame 212, the method 200 may loop back to frame 204 for detecting the rotational input and output speeds $W_i$, $W_o$ of the torque converter assembly 38. Overall, the method 200 may be used to predict the health of a torque converter lock-up clutch and regulate operating parameters to adjust torque transmission via the lock-up clutch. The method may be additionally used to alert a user of the vehicle 10 or a service technician regarding required maintenance of the lock-up clutch in response to the comparison of the determined numeric SOH coefficient 128 to the calibrated SOH threshold 132, and put the engine 14 into a limp home mode to reduce the amount of torque the lock-up clutch needs to transmit when the lock-up clutch predicted health is degraded below a critical value.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of predicting the health of and controlling a lock-up clutch actuated via a hydraulic pressure and arranged inside an automatic transmission torque converter, the method comprising:
   determining, via a controller, rotational input and output speeds of the torque converter;
   determining, via the controller, a magnitude of the hydraulic pressure;
   determining, via the controller, a level of performance of the lock-up clutch across multiple torque converter operating modes using the determined rotational input and output speeds of the torque converter and the determined magnitude of the hydraulic pressure;
   calculating, via the controller, a numeric state of health (SOH) coefficient of the lock-up clutch that quantifies a relative severity of degradation of a plurality of lock-up clutch characteristics across the multiple torque converter operating modes; and
   executing, via the controller, a control action with respect to the lock-up clutch when the calculated numeric SOH coefficient for at least one of the torque converter operating modes is less than a calibrated SOH threshold.

2. The method of claim 1, wherein the lock-up clutch is a friction clutch, and the lock-up clutch characteristics include at least one of a friction coefficient and a rotational speed variation thereof.

3. The method of claim 1, further comprising:
   detecting the hydraulic pressure via a hydraulic pressure sensor; and
   receiving, via the controller, the detected hydraulic pressure to determine the magnitude of the hydraulic pressure.

4. The method of claim 1, wherein calculating the numeric SOH coefficient of the lock-up clutch is accomplished via a regression analysis.

5. The method of claim 1, wherein calculating the numeric SOH coefficient of the lock-up clutch is accomplished via a time domain analysis.

6. The method of claim 1, wherein calculating the numeric SOH coefficient of the lock-up clutch is accomplished via a frequency domain analysis.

7. The method of claim 1, wherein the control action includes activating a service indicator configured to signal that service of the lock-up clutch is required.

8. The method of claim 7, wherein the control action is further configured to provide the numeric SOH coefficient to a torque converter service provider.

9. The method of claim 1, wherein the control action includes adjusting the magnitude of the hydraulic pressure.

10. The method of claim 1, further comprising determining an input torque to the torque converter, wherein the control action includes reducing the input torque.

11. A motor vehicle comprising:
   a power-source configured to generate power-source torque;
   a drive wheel;
   an automatic transmission configured to transmit the power-source torque to the drive wheel;
   a pump configured to generate a hydraulic pressure;

a torque converter configured to operatively connect the power-source to the automatic transmission and having:
  a fluid coupling configured to operatively connect the power-source to the automatic transmission; and
  a lock-up clutch arranged operatively in parallel with the fluid coupling and selectively actuated by the hydraulic pressure to mechanically connect the power-source to the automatic transmission; and
an electronic controller configured to:
  determine rotational input and output speeds of the torque converter;
  determine a magnitude of the hydraulic pressure;
  determine a level of performance of the lock-up clutch across multiple torque converter operating modes using the detected rotational input and output speeds of the torque converter and the determined magnitude of the hydraulic pressure;
  calculate a numeric state of health (SOH) coefficient of the lock-up clutch that quantifies a relative severity of degradation of a plurality of lock-up clutch characteristics across the multiple torque converter operating modes; and
  execute a control action with respect to the lock-up clutch when the calculated numeric SOH coefficient for at least one of the torque converter operating modes is less than a calibrated SOH threshold.

12. The vehicle of claim 11, wherein the lock-up clutch is a friction clutch, and wherein lock-up clutch characteristics include at least one of a friction coefficient and a rotational speed variation thereof.

13. The vehicle of claim 11, further comprising a hydraulic pressure sensor configured to detect the hydraulic pressure, wherein the controller is additionally configured to receive the detected hydraulic pressure to determine the magnitude of the hydraulic pressure.

14. The vehicle of claim 11, wherein the controller is configured to calculate the numeric SOH coefficient of the lock-up clutch via a regression analysis.

15. The vehicle of claim 11, wherein the controller is configured to calculate the numeric SOH coefficient of the lock-up clutch via a time domain analysis.

16. The vehicle of claim 11, wherein the controller is configured to calculate the numeric SOH coefficient of the lock-up clutch via a frequency domain analysis.

17. The vehicle of claim 1, wherein the control action includes activation of a service indicator configured to signal that service of the lock-up clutch is required.

18. The vehicle of claim 17, wherein the control action further includes selective provision of the numeric SOH coefficient to a service provider for the torque converter.

19. The vehicle of claim 11, wherein the control action further includes adjustment of the magnitude of the hydraulic pressure.

20. The vehicle of claim 11, wherein the controller is additionally configured to determine an input torque to the torque converter, and wherein the control action further includes reducing the input torque.

* * * * *